_United States Patent_ [19]

Jennings et al.

[11] 3,780,782
[45] Dec. 25, 1973

[54] TIRE WITH BELT BETWEEN BIAS CARCASS PLIES

[75] Inventors: George L. Jennings, Grosse Point Woods; Parks M. Nichols, Detroit, both of Mich.

[73] Assignee: Uniroyal Inc., New York, N.Y.

[22] Filed: Dec. 17, 1970

[21] Appl. No.: 99,109

Related U.S. Application Data

[63] Continuation-in-part of Ser. No. 793,299, Jan. 23, 1969, abandoned.

[52] U.S. Cl.............................. 152/356, 152/DIG. 19
[51] Int. Cl.................................................. B60c 9/20
[58] Field of Search..................... 152/354, 356, 361

[56] References Cited
UNITED STATES PATENTS

| | | | |
|---|---|---|---|
| 1,181,540 | 5/1916 | Peaslee........................... | 152/361 X |
| 3,068,926 | 12/1962 | Jacob et al........................ | 152/354 |
| 1,374,957 | 4/1921 | Seaton.............................. | 152/348 |
| 2,930,425 | 3/1960 | Lugli et al....................... | 152/361 X |

FOREIGN PATENTS OR APPLICATIONS

| 1,554,424 | 1/1969 | France............................. | 152/354 |

*Primary Examiner*—Gerald M. Forlenza
*Assistant Examiner*—George H. Libman
*Attorney*—Charles A. Blank

[57] ABSTRACT

A bias ply tire incorporates a pair of oppositely oriented non-woven breakers between two successive body plies in the region underlying the crown region of the tread layer. The breakers are inserted prior to shaping and curing. In a four-ply tire, one such pair of breakers preferably is inserted between the first and second, that is, the innermost, body plies, and another such pair of breakers may similarly be inserted between the third and fourth, that is, the outermost, body plies. Also, a third such pair of breakers may be inserted between the second and third body plies if further improved results are desired. The cord directions of each successive layer, whether a body ply or a breaker, may alternate relative to the longitudinal center line of the tire crown or the cords of successive coacting layers of breaker and body ply may be in the same general direction relative to the longitudinal center line of the tire crown. The result is an improvement in stability, owing to a lower cord angle in the crown region, without any sacrifice of ride softness, owing to a higher cord angle in the sidewall region.

24 Claims, 7 Drawing Figures

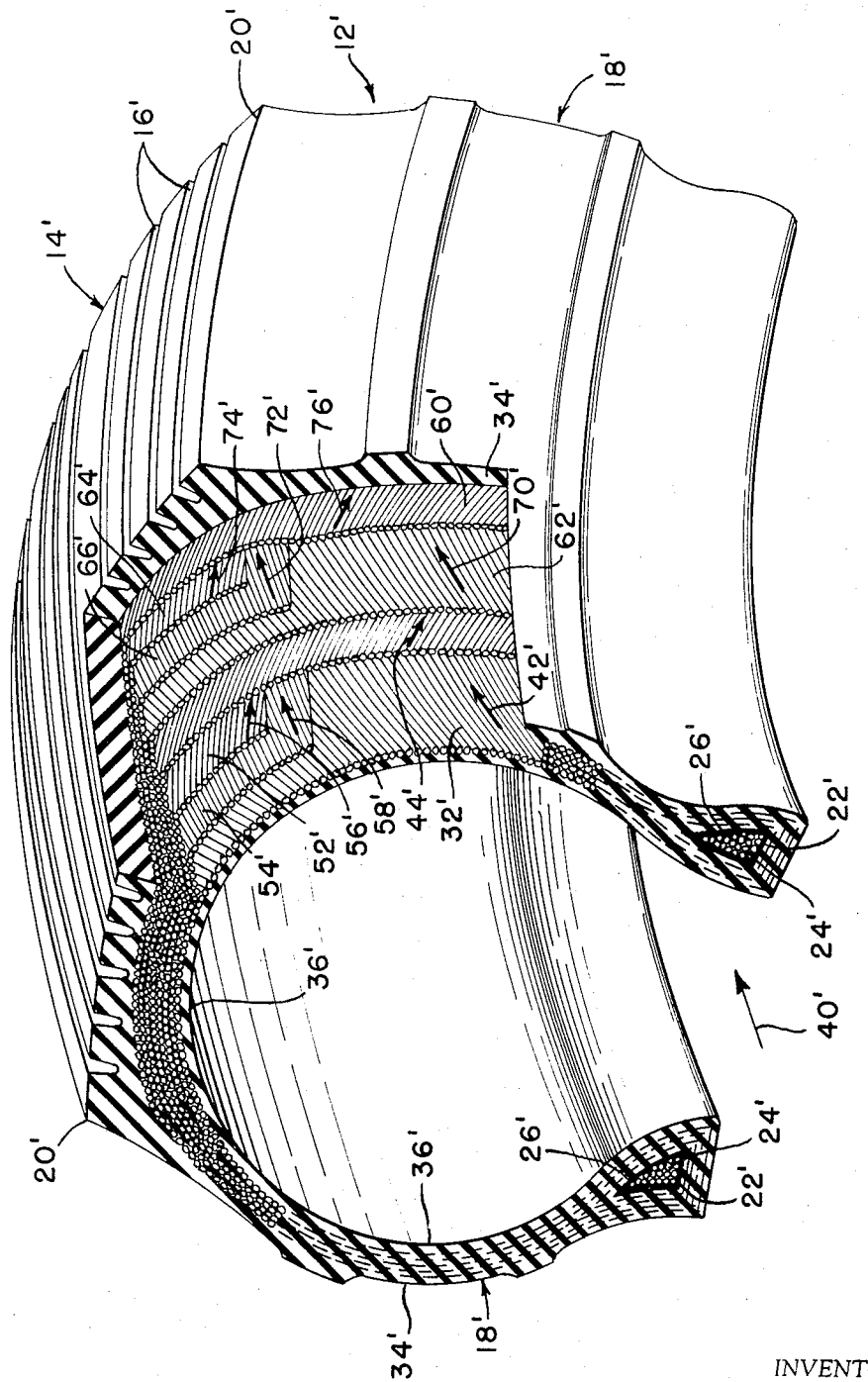

TIRE WITH BELT BETWEEN BIAS CARCASS PLIES

This application is a continuation-in-part of our co-pending application, Ser. No. 793,299, filed Jan. 23, 1969, entitled Bias Ply Tire, and now abandoned.

This invention relates to pneumatic tires for automotive vehicles, and is particularly applicable to the bias ply type of tire construction.

Among the objectives of automotive tire design is an improved stability of the tire without sacrificing ride softness. A softer ride increases passenger comfort, while improved stability contributes to more precise and safer control of the vehicle, and also causes the tire to run cooler and wear less rapidly. The prior art has recognized that, in a bias ply tire, the way to achieve a softer ride is to have a higher cord angle in the sidewalls, and the way to improve stability is to have a lower cord angle in the crown region. The difficulty has been that until now, no one has found a practical way to make the cord angle lower in the crown and higher in the sidewalls simultaneously than in a conventional tire to which the cosine law is applicable as will be discussed subsequently. Accordingly, in the past there has always been a tradeoff between comfort and stability in the design of a tire.

Breakers have been used in the construction of tires for quite some time. Generally these were disposed immediately beneath the crown of the tire, between the tread layer and the outermost carcass ply. When so placed, breakers have a tendency to separate from the carcass plies at the breaker edges, particularly in severe service. In some cases the prior art appears to have experimented with the insertion of a single breaker between the carcass plies of a bias ply tire, but without any known improvement in ride softness or stability. Pairs of oppositely oriented breakers have also been placed between the carcass plies of radial ply tires, but the radial ply type of tire construction is inherently incapable of developing improved riding qualities or greater stability from such breaker placement.

Among the objects of the invention are to provide a tire which rides softly and a tire which is more stable. In particular, it is an object of the invention to achieve a softly riding tire and a greater stability in the same tire at the same time. Additional objects are to provide longer tire wear, cooler running temperatures, and greater resistance to separation at the breaker edges.

In accordance with the invention and contrary to the conventional belief of the tire industry, it is possible to achieve a lower crown cord angle and a higher sidewall cord angle simultaneously in a bias ply tire. This surprising result has been achieved by a tire structure including means between the carcass plies which, during the shaping and curing of the tire body, interact with the carcass plies in such a way that the resulting cured cord angles are lower in the crown region and higher in the sidewall region than the cosine law predicts.

In conventional tire constructions, wherein the breakers are exterior to the carcass plies, the resultant shaped cord angles of the plies are progressively lower in each successive ply. That is, the first or innermost carcass ply has the highest cord angle and the outermost breaker ply has the lowest cord angle. The normal pantographic action between adjacent plies during shaping and curing is free to follow the principles of the cosine law due to the absence of interacting breakers.

The resultant shaped cord angles in one form of the tire in accordance with the invention are essentially the same in similar components. The cord angles of all the breakers are equal (but opposite) and the cord angles in the crown region of all the associated carcass plies are equal (but opposite). Also, the shaped cord angles in the sidewall portions of the carcass plies are equal (but opposite).

In specific forms of the invention, the interacting means is a pair of breakers inserted between two adjacent carcass plies. The cord directions of successive plies and breakers may or may not be alternating. In manufacturing the tire of the invention, first one bias ply is disposed on the building drum on which a suitable air-impervious liner may have been previously disposed, then a first breaker, a second breaker, and a second bias ply are applied in accordance with the invention with successive breakers in oppositely disposed relationship. After shaping and curing, it is found that the interaction of the two interposed breakers with the surrounding body plies produces a lower than expected carcass cord angle in the crown and a higher than expected carcass cord angle in the sidewall. As a result, a soft ride and greater stability are obtained simultaneously.

FIG. 7 is a cutaway perspective view of a portion of a finished four-ply bias tire in accordance with a preferred form of the invention.

The same reference characters and the same reference characters primed refer to corresponding elements throughout the several views of the drawings.

Figure 1:
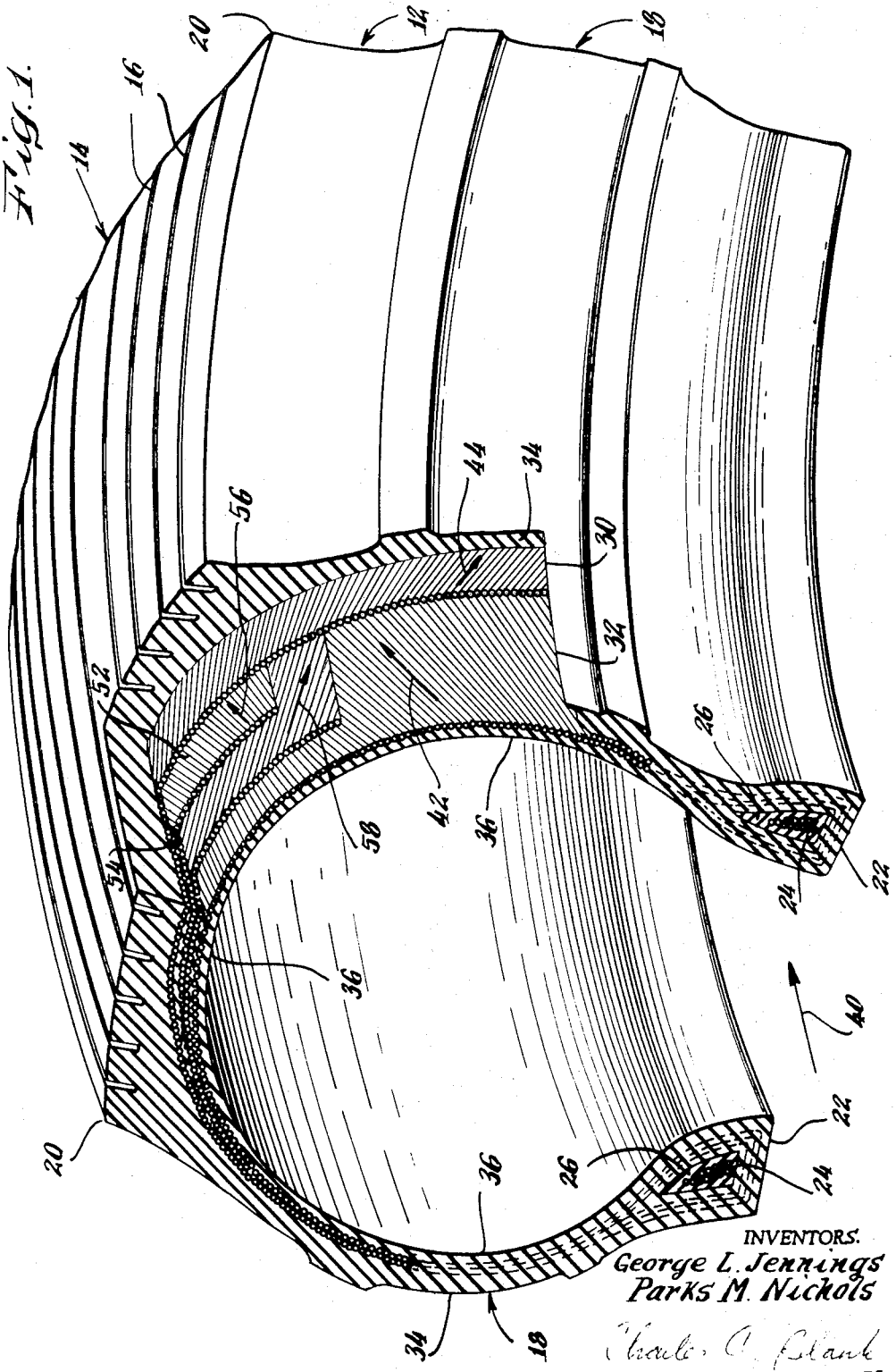
FIG. 1 is a cutaway perspective view of a portion of a finished two-ply bias tire in accordance with this invention.

The tire of FIG. 1 is similar in some respects to a conventional two-ply tire employing the bias ply type of contruction which is popular in the industry. This tire comprises a body 12 of generally toroidal configuration. The periphery of the toroid comprises a tread layer 14 in which are molded grooves 16.

A pair of curved sidewalls 18 extend radially from the shoulders 20 of the tread layer 14 and terminate in bead assemblies 22 which are adapted to engage the rim of a wheel. The beads 22 are reinforced by steel wires 24 running longitudinally therethrough, and processed in the usual manner with a rubbery material 26.

The sidewalls 18 incorporate a pair of carcass plies 30 and 32, which may be formed of nylon or rayon cords, or other suitable materials, combined into sheet form with a rubbery material by conventional methods such as calendering. Additional layers of material 34 and 36 form the outer and inner surfaces respectively of each sidewall 18.

Thus, the body plies 30 and 32 extend substantially continuously over one sidewall 18, across the crown of the tread layer 14, and over the other sidewall 18. The plies also encompass the beads 22 at the extremities of each sidewall.

FIG. 1 shows the individual cords employed in the carcass plies 30 and 32. As is usual in a bias-ply tire, the cord directions of the plies 30 and 32 are opposed. That is, if an observer looks in the direction indicated by the arrow 40 along the longitudinal center line of the tread layer 14, the direction of the cords of ply 32 slants to the left across that center line, as indicated by arrow 42, while the cords of ply 30 slant to the right relative to that line, as indicated by arrow 44. The angle between arrows 42 and 40 is the cord angle for ply 32, and similarly the angle between arrows 44 and 40 is the cord angle for ply 30.

In the manufacture of a conventional tire the plies 30 and 32 ordinarily are laid flat upon a drum with their respective cords oriented in the opposite directions indicated by arrows 42 and 44. In a typical instance, the cord angle is, for example, 64.5° relative to a reference line which subsequently becomes the longitudinal center line of the tread layer 14. Subsequently, the carcass plies 30 and 32 are curved downwardly from the region of the crown of the tread layer 14 to form the two sidewalls 18, while the tire 10 is shaped into a toroid and subsequently cured in a manner conventional in the industry.

Referring to a conventional tire without breakers, it is known that after shaping and curing, the cord angles will no longer be the same as when the carcass plies 30 and 32 were initially placed upon the drum. The shaped angle is substantially everywhere less than the building angle. The exact value of the shaped angle varies, being lowest at the center of the tread layer 14, and somewhat higher at the region of the beads 22, but still not as high as the building angle. Between its extreme values, the shaped angle varies smoothly as a function of distance from the longitudinal center line, according to a mathematical relationship known as the cosine law, which is illustrated by trace 50 in the graph of FIG. 3.

The cosine law is widely known in the tire industry as an equation for predicting the cord angle in a bias ply tire from crown angle to sidewall angle. As indicated in the publication "Tire Engineering and Development" by Johnson available at the University of Akron, Akron, Ohio, the cosine law may be expressed:

$$\text{Cos } ca = \text{Cos } ba \times S/1 + E$$

where $ca$ represents the cured cord crown angle (or cured sidewall angle) at each pont from the crown center, $ba$ represents the fabric bias angle, $S$ represents the expansion ratio of the plies, at each point from the crown center, from a tire on a flat drum to a shaped tire, $E$ represents per cent elongation of the cords (cord stretch)

The expansion ratio measured from a point on the flat built tire to a point on the shaped and cured tire varies from the region of the crown to the region of the bead and thus the angle $ca$ varies as the measurement proceeds around the tire.

Figure 3:
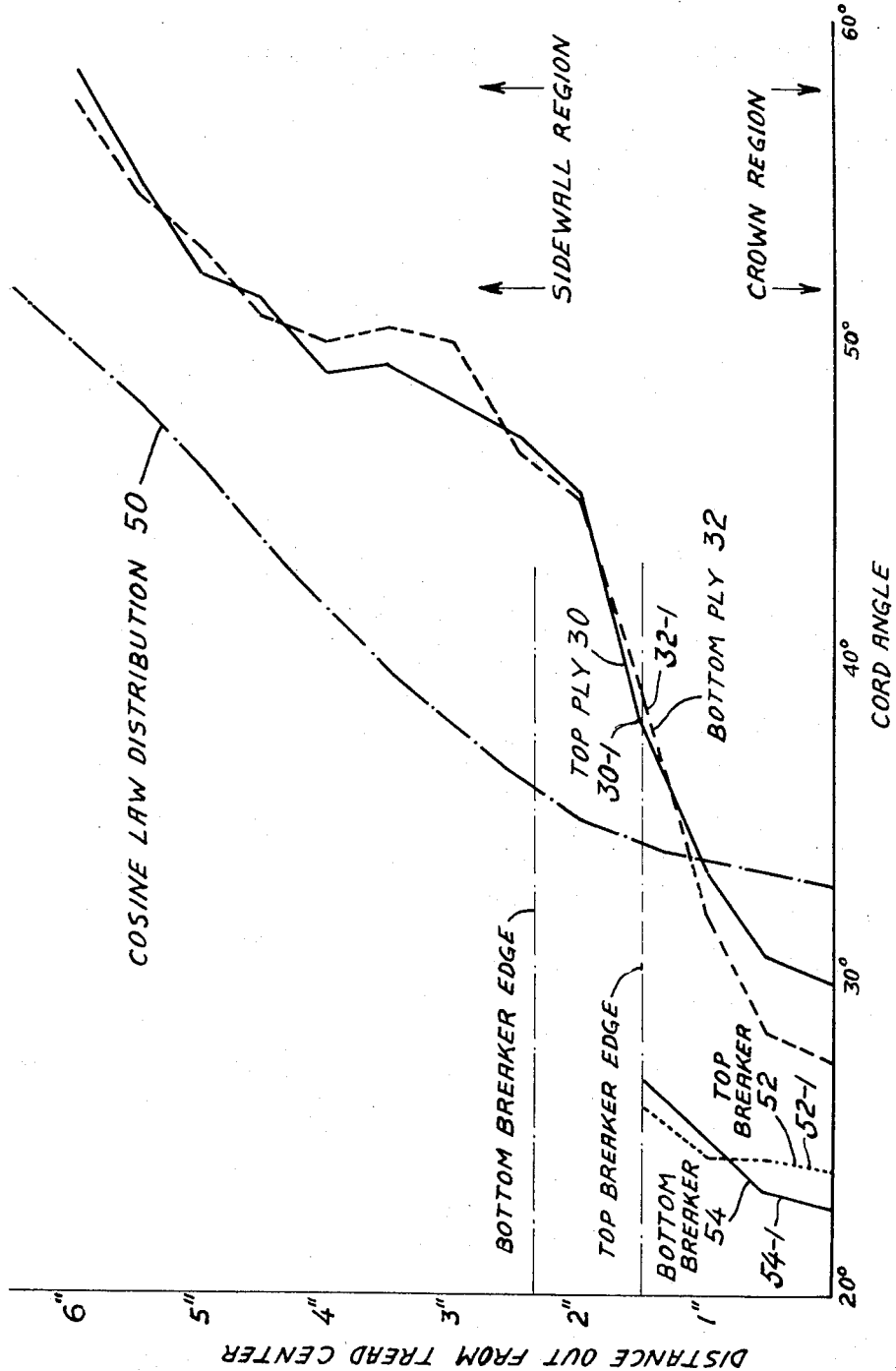
FIG. 3 is a graph showing the cord angle distribution achieved by means of this invention, compared with the distribution predicted by the cosine law.

Trace 50 of FIG. 3 was derived by making actual measurements of a cured tire of conventional construction.

Inspection of trace 50 of FIG. 3 reveals that the reduction in cord angle from the built to the shaped state, an effect known as pantographing, pulls the cord angle below the built value in the sidewall region. Such a reduction of the sidewall cord angle undesirably reduces the softness of the ride provided by the tire. It would therefore be desirable to limit the reduction in the sidewall cord angle which occurs during shaping.

Trace 50 also reveals that the cosine law distribution results in an even larger decrease in the cord angle in the crown region. Nevertheless, for the sake of improved stability, it is desirable for the cured angle in the crown region to be reduced still further.

In accordance with the present invention, both of these objectives have been achieved, specifically by means involving a novel distribution of breakers. A breaker is a layer of material, usually non-woven and comprising cords of nylon, rayon, steel or other suitable material, conventionally calendered with a rubbery compound and applied entirely around the tire, and underlying the tread layer 14. Breakers usually extend only slightly or not at all into the sidewalls 18. Such beakers are normally interposed between the tread and the outermost carcass ply, to lend additional stability to the tire.

Contrary to conventional practice, the breaker is omitted between the tread layer and the outermost carcass ply 30 of the tire constructed in accordance with the invention. Moreover, two breakers 52 and 54 are located between carcass plies 30 and 32. While the prior art has experimented with a single breaker between bias body plies, it has not suggested the advantages of a pair of breakers such as 52 and 54 in that particular location in a bias ply tire.

In FIG. 1 the direction of the cords of breakers 52 and 54 are indicated by arrows 56 and 58, respectively. It is apparent that the cords of the two breakers 52 and 54 slant in opposite directions relative to the longitudinal center line of the tread layer 14; arrow 56 slanting to the left, and arrow 58 slanting to the right. In addition, it should be noted that the cord directions of the successive layers 30, 52, 54 and 32 are in alternating relationship. That is, the cords of carcass ply 30 slant to the right (arrow 44), the cords of breaker 52 immediately below it slant to the left (arrow 56), the cords of the next succeeding layer, breaker 54, slant to the right (arrow 58), and finally the cords of the next succeeding layer, carcass ply 32, slant to the left, (arrow 42), all with reference to the longitudinal center line of tread layer 14, and as seen by an observer looking along that center line in the direction indicated by arrow 40.

It has been found that because the cord angle of the breakers is lower than the cord angle of the adjacent carcass plies, the breakers exaggerate the pantographing of the carcass plies in the tread region, and since the carcass ply ends are fixed at the beads, the tendency of the carcass plies to pantograph in the sidewall region is minimized. Also, the fact that, not one, but two breakers 52 and 54 are located between the carcass plies 30 and 32, plus the fact that the cord direction of each breaker may be in opposed or unopposed relationship to the cord direction of its adjacent carcass ply and its adjacent breaker, produces an interaction between the cords of the carcass plies and breakers during shaping, and this interaction causes the cured cord angles to vary from the cosine law distribution. A frictional force is exerted by the different slanting cords of breaker 52 upon the slanting cords of carcass ply 30, and a similar force is exerted by the different slanting cords of breaker 54 upon the slanting cords of carcass ply 32, which restricts them from assuming the orientation which would normally be expected. Moreover, breakers 52 and 54 interact with each other.

This theory is supported by the observation that prior art placement of a pair of cross-oriented breakers between the carcass plies of a radial ply tire, and of a single breaker between the carcass plies of a bias ply tire, did not produce the angle changes and the improvement in stability without loss of ride softness achieved by this invention.

In manufacturing the tire according to one form of this invention, the bottom carcass ply 32 is laid flat on the drum over the liner, then the bottom breaker 54 is laid thereover in opposed relationship, the top breaker 52 follows in opposed relationship to the breaker 54, and finally the top carcass ply 30 is applied over the breaker 52 in opposed relationship to ply 32. Thus, in ascending order from the drum, the cord directions of the layers 32, 54, 52 and 30 slant left, right, left, right as indicated by arrows 42, 58, 56 and 44, respectively.

In accordance with this invention, the building cord angles at which the breakers 52 and 54 are applied over the drum are somewhat lower than those of the carcass plies 30 and 32. Experimentation with this differential between the building cord angles indicates that a value of up to about 15° is open to consideration. However, the largest practical angle differential seems to be about 8°, without risking separation of adjacent carcass layers at the breaker edges, and probably it is preferable to use a differential in the range from 3° to 5°. In a specific example where the carcass plies 30 and 32 were laid down on the drum at building cord angles of 64.5° relative to the reference line, a differential of 8° between the breaker angles and the carcass ply angles was employed. Accordingly, the building cord angle at which the breakers 52 and 54 were applied to the drum was 56.5° relative to the reference line.

The introduction of such a cord angle differential between the breakers 52, 54 and the carcass plies 30, 32, with the breakers having the lower cord angle, aids the interaction between these layers as they are incorporated into a tire structure. While angle differentials up to 15° have been used successfully, it has been experienced that angle differentials of approximately half the magnitude are more desirable. When such an angle differential is employed, and the breaker edges extend in stepped — off relation to the proximity of the shoulders 20, the resultant tire is more resistant to separation of the adjacent layers in severe service.

Figure 4:
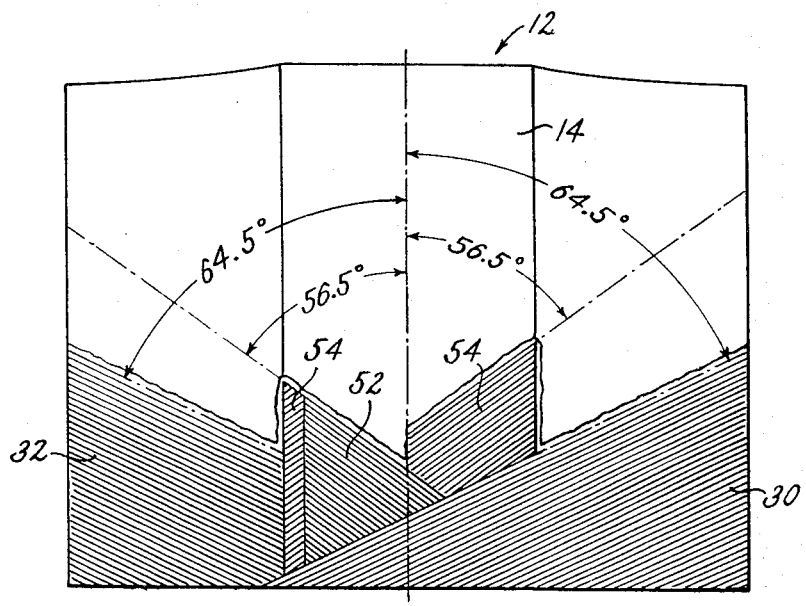
FIG. 4 is a plan view, with parts broken away, of a tire tread layer and carcass, in accordance with the invention on a building drum.

Referring now to one form of the invention shown in FIG. 4, the tire body 12 is represented on a building drum with tread layer, breakers, and plies being partly broken away so that the cord angles may be seen. The breakers and plies have been broken away along the lines designating the angles of the cords. As represented in the drawing, the outermost ply 30 has a cord angle of 64.5°. The breaker 52 has a cord angle of 56.5° which is opposition to the cord angle of the outermost ply 30. The breaker 54 has a cord angle of 56.5° which is in opposition to the cord angle of the breaker 52. The innermost ply 32 has a cord angle of 64.5° which is in opposition to the cord angle of the breaker 54.

After the layers 32, 54, 52, and 30 have been superposed as described, they are then subjected to the usual shaping process, during which pantographing of the cord angles takes place as expected. What is not expected, however, is the extent and direction of variations from the cosine law. In FIG. 3, trace 32-1 shows the shaped cord angle distribution for the bottom carcass ply 32, while trace 30-1 shows the corresponding data for the top carcass ply 30, and traces 54-1 and 52-1 show the shaped cord angle distributions for the breakers 54 and 52, respectively.

The breaker cord angles are reduced from their building value of 56.5° to shaped values ranging from 23° to 24° (at the longitudinal center line of the tread 14) up to 25° to 26° (near the edges of the breakers 52 and 54, i.e., near the shoulders 20). This large differential between the building and shaped cord angles for the breakers 52 and 54 indicates that a powerful force has been exerted upon the breaker cords during shaping.

As for the shaped cord angles of the carcass plies themselves, traces 30-1 and 32-1 show that these angles are depressed below the values predicted by the cosine law trace 50, in the lower part of the graph which represents the crown region of the tread layer 14. This lower crown angle in the tread region produces a substantial improvement in the stability of the tire. At the same time, the shaped cord angle in the upper portion of the graph, representing the region of the sidewalls 18, is seen to be everywhere greater than the values indicated by the cosine law trace 50. As a result, the tire achieves softness of its ride. To recapitulate, the present invention succeeds in achieving a lower crown angle at the same time that it achieves a higher sidewall angle. As a result, stability is improved without sacrificing softness of the ride.

Figure 2:
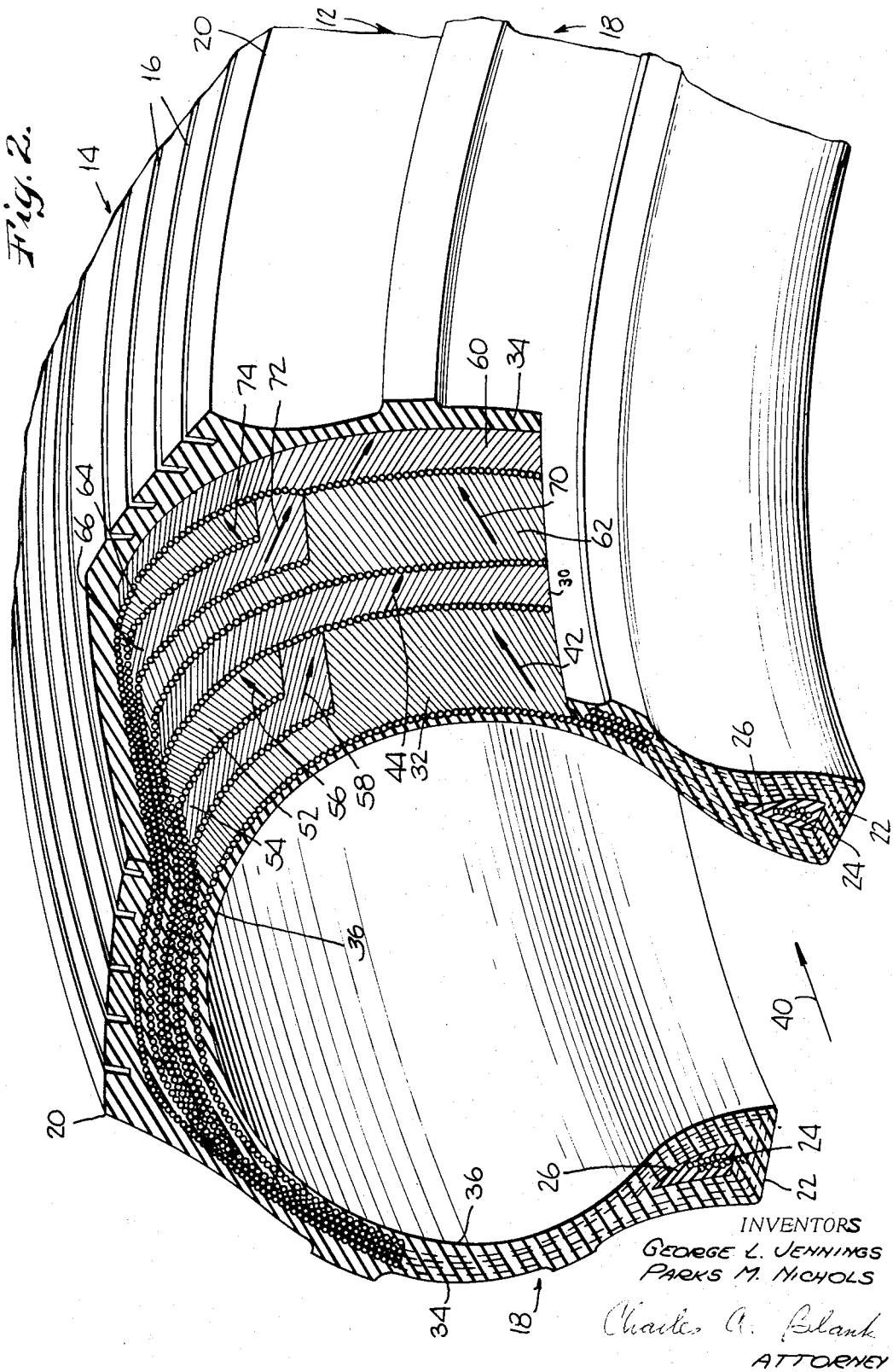
FIG. 2 is a cutaway perspective view of a portion of a finished four-ply bias tire in accordance with the invention.

The present invention is also applicable to four-ply bias tires. As seen in FIG. 2, a bias tire of the kind described herein may comprise, in addition of the carcass plies 30 and 32, an additional pair of carcass plies 60 and 62. In that case, an additional pair of breakers 64 and 66 may be provided between the two additional carcass plies.

In manufacturing a four-ply tire in accordance with one embodiment of this invention, the bottom carcass ply 32 is first laid down on the drum over a liner previously disposed thereon, followed by breaker 54, breaker 52 and carcass ply 30, for example, at angles similar to the angles of corresponding members of the FIG. 1 tire while the carcass of the FIG. 1 tire is on the drum. Then the previously discussed carcass ply 62, breaker 66, breaker 64 and the topmost carcass ply 60 are applied thereover in that order, for example, at angles similar to the angles of carcass ply 32, breaker 54, breaker 52, and carcass ply 30, respectively, of the FIG. 1 tire while the carcass of the FIG. 1 tire is on the drum. The tire is subsequently shaped and cured in the conventional manner. Once again, no breaker is placed in the conventional location between the tread layer and carcass ply 30.

The cords of the additional carcass plies 60 and 62 and the additional breakers 64 and 66, shown in FIG. 2, function in a similar manner to carcass plies 30 and 32 and breakers 52 and 54 as previously described. Specifically, the cords of the carcass ply 62 may slant in the direction shown (arrow 70), the next succeeding layer, breaker 66, may slant oppositely (arrow 72), the next succeeding layer, breaker 64, slants oppositely to breaker 66 (arrow 74), and the next succeeding layer, carcass ply 60, slants oppositely to carcass ply 62 (arrow 76).

The pattern of left, right alternation of succeeding layers may be carried out through all the layers 32, 54, 52, 30, 62, 66, 64, 60 of the tire carcass. This promotes interaction between opposed cords throughout the tire.

If further improvement is desired, a third pair of breakers, similar to breakers 64 and 66, may be disposed between plies 30 and 62 of the FIG. 2 embodiment with breaker cord angles and slant of cords selected in a manner similar to that previously described in connection with the FIG. 2 embodiment. That is, the breaker in contact with ply 30 may have a slanted cord direction in opposition to the cord direction of ply 30, and the breaker in contact with ply 62 may have a slanted cord direction in opposition to the cord direction of ply 62.

If only one pair of breakers is used in a four-ply tire, it may be positioned between any two carcass plies to provide greater stability together with softness of ride than is provided by a corresponding tire without a breaker.

Figure 5:
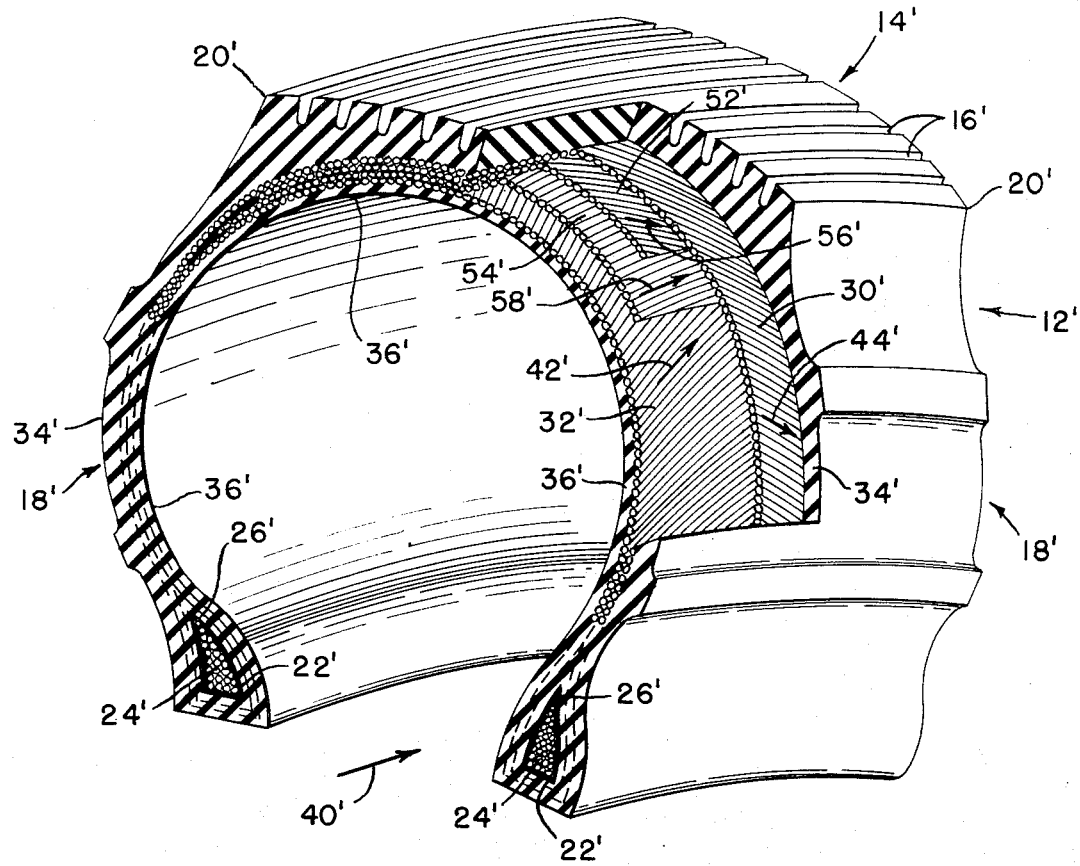
FIG. 5 is a cutaway perspective view of a portion of a finished two-ply bias tire made in accordance with a preferred form of the invention.
Figure 6:
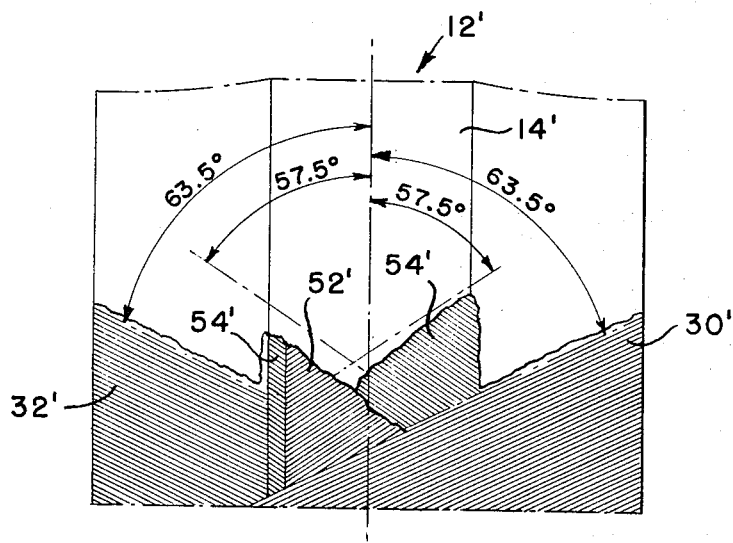
FIG. 6 is a plan view, with parts broken away, of a tire tread layer and carcass on a building drum in accordance with a preferred form of the invention as shown in FIG. 5.

In accordance with a preferred form of the invention shown in FIG. 5, the FIG. 5 tire is a two-ply tire generally similar to the FIG. 1 tire except that, for example, the cords of breaker 52' slant to the right and the cords of breaker 54' slant to the left. As represented in FIG. 6, the building cord angles of the carcass plies 30' and 32' are preferably 63.5° relative to the longitudinal center line of the tread layer. The directions of the cords of breakers 52', 54', of FIG. 6 are reversed with respect to the longitudinal center line of the tread layer as compared with the cords of breakers 52, 54 of FIG. 4. The building cord angles of breakers 52', 54' are preferably 57.5° relative to the longitudinal center line of the tread layer. Thus, the cord directions of adjacent carcass plies of FIG. 5 and 6 slant oppositely to each other relative to the longitudinal center line of the tread layer and the cord directions of the breakers slant oppositely to each other relative to the longitudinal center line of the tread layer. The cords of each breaker slant in the same general direction as the cords of each carcass ply adjacent thereto relative to the longitudinal center line of the tread layer. In the FIG. 5 tire the angle of the cords of the carcass plies relative to the longitudinal center line of the tread layer is less in the region of the center line than the angle predicted in that region by the cosine law. The angle of the cords of the carcass plies relative to the longitudinal center line of the tread layer is greater in the sidewall region than the angle predicted for the sidewall region by the cosine law.

As represented in FIG. 6, the building cord angles at which the breakers 52' and 54' are applied over the drum are somewhat lower than those of the carcass plies 30' and 32'. It is believed that values of the angle differential of up to about 15° may be used, while about 5° to about 8° is the preferred range of values and about 2° is believed to be the minimum useful angle differential. The more compliant materials selected for the breakers and carcass plies can ordinarily be used with higher angle differentials while the less compliant materials are ordinarily useful with lower angle differentials in the ranges stated above for the building cord angles of tires with opposed or unopposed breaker and adjacent carcass ply angular relationships.

The FIG. 7 tire is a four-ply tire having a first pair of plies and first pair of breakers applied to a drum, for example, at angles similar to angles of corresponding members of the FIG. 5 tire while the FIG. 5 tire is on the drum and utilizing an additional pair of breakers between the two additional carcass plies. The second pair of carcass plies and the second pair of breakers are applied to a drum, of example, at angles similar to the angles of the first pair of carcass plies and first pair of breakers of the FIG. 5 tire while the carcass of the FIG. 5 tire is on the drum.

While specific examples of two-ply and four-ply tires constructed in accordance with the invention have been described herein, tires having more than two plies may be constructed in accordance with the invention by utilizing the principles described herein to position at least a pair of breakers between selected carcass plies.

While there have been described what are at present believed to be the preferred embodiments of the invention, it will be obvious to those skilled in the art that various changes and modifications may be made therein without departing from the invention, and, it is therefore, aimed to cover all such changes and modifications as fall within the true spirit and scope of the invention.

We claim:

1. A bias ply tire having crown and sidewall regions comprising:

a tread layer;

and a bias ply carcass including at least a pair of beads and at least two carcass plies extending from bead to bead, each of said carcass plies having cords oriented in a respective direction at an acute angle relative to the longitudinal center line of said tread layer, said angle being greater in the sidewall region than in the crown region of the tire;

said carcass also including at least a pair of breakers having cords and being in overlaid relation and in direct contact with each other and with the adjacent carcass plies and both breakers disposed, in the region underlying said tread layer, between a pair of said carcass plies which are separated from each other only by at least one of said breakers over the entire area of said breakers.

2. A tire in accordance with claim 1, wherein:

each of said breakers has cords oriented in a respective direction;

said breakers being positioned with their cord directions opposed to each other.

3. A tire in accordance with claim 1, wherein:

each of said carcass plies has cords oriented in a respective direction;

said carcass plies being positioned with their cord directions at acute angles to the longitudinal center line of said tread layer, and opposed to each other.

4. A tire in accordance with claim 2, wherein:

said breakers are positioned with their cord directions opposed to each other and at acute angles relative to the longitudinal center line of said tread layer.

5. A tire in accordance with claim 1, wherein:

each of said carcass plies has cords oriented in a respective direction at an acute angle relative to the longitudinal center line of said tread layer;

each of said breakers has cords oriented in a respective direction at an acute angle relative to said longitudinal center line of said tread layer;

and the cord directions of each successive carcass ply and breaker slant oppositely to the cord directions of each adjacent carcass ply and breaker in alternating directions relative to said longitudinal center line of said tread layer through all of said carcass plies and breakers.

6. A tire in accordance with claim 5, wherein:
said cord angles of said carcass plies are greater than said cord angles of said breakers relative to said longitudinal center line of said tread layer.

7. A tire in accordance with claim 5, wherein:
said tread layer is disposed directly in contact with the outermost one of said carcass plies.

8. A tire in accordance with claim 5 in which said angle of said cords of said carcass plies relative to said longitudinal center line of said tread layer is less in the region of said center line than the angle predicted in that region by the cosine law.

9. A tire in accordance with claim 5 having a sidewall region in which said angle of said cords of said carcass plies relative to said longitudinal center line of said tread layer is greater in said sidewall region of the angle predicted for said sidewall region by the cosine law.

10. A tire in accordance with claim 8 having a sidewall region in which said angle of said cords of said carcass plies relative to said longitudinal center line of said tread layer is greater in said sidewall region than the angle predicted for said sidewall region by the cosine law.

11. A tire in accordance with claim 1, wherein:
each of said carcass plies has cords oriented in a respective direction at an acute angle relative to the longitudinal center line of said tread layer;
each of said breakers has cords oriented in a respective direction at an acute angle relative to said longitudinal center line of said tread layer;
and the cord directions of said adjacent carcass plies slant oppositely to each other relative to said longitudinal center line of said tread layer and the cord directions of each pair of breakers slant oppositely to each other relative to said longitudinal center line of said tread layer.

12. A tire in accordance with claim 11, wherein:
said cords of each breaker slant in the same general direction as said cords of each carcass ply adjacent thereto relative to said longitudinal center line of said tread layer.

13. A tire in accordance with claim 11 in which said angle of said cords of said carcass plies relative to said longitudinal center line of said tread layer is less in the region of said center line than the angle predicted in that region by the cosine law.

14. A tire in accordance with claim 11 having a sidewall region in which said angle of said cords of said carcass plies relative to said longitudinal center line of said tread layer is greater in said sidewall region than the angle predicted for said sidewall region by the cosine law.

15. A tire in accordance with claim 13 having a sidewall region in which said angle of said cords of said carcass plies relative to said longitudinal center line of said tread layer is greater in said sidewall region than the angle predicted for said sidewall region by the cosine law.

16. A bias ply tire having crown and sidewall regions comprising:
a tread layer;
and a bias ply carcass including a pair of beads and two pairs of carcass plies extending from bead to bead, each of said carcass plies having cords oriented in a respective direction at an acute angle relative to the longitudinal center line of said tread layer, said angle being greater in the sidewall region than in the crown region of the tire;
said carcass also including two pairs of breakers having cords;
the outermost pair of said carcass plies underlying said tread layer and having a first pair of said breakers in overlaid relation and in direct contact with each other and with the adjacent carcass plies of said outermost pair and both breakers of said first pair being disposed, in the region underlying said tread layer, between said outermost pair of said carcass plies which are separated from each other only by at least one of said breakers of said first pair over the entire area of said breakers of said first pair;
the innermost pair of said carcass plies underlying said outermost pair and having a second pair of breakers in overlaid relation and in direct contact with each other and with the adjacent carcass plies of said innermost pair and both breakers of said second pair being disposed, in the region underlying said tread layer, between said innermost pair of said carcass plies which are separated from each other only by at least one of said breakers of said second pair over the entire area of said breakers of said second pair.

17. As an intermediate article of manufacture, an unshaped, uncured drum-built bias ply tire body comprising:
a tread layer;
and a bias ply carcass of approximately cylindrical shape including at least a pair of beads approximately at the edges of the cylinder and at least two carcass plies extending from bead to bead, each of said carcass plies having cords oriented in a respective direction at an acute angle relative to the longitudinal center line of said tread layer;
said carcass also including at least a pair of breakers having cords and being in overlaid relation and in direct contact with each other and with the adjacent carcass plies and both breakers disposed, in the region underlying said tread layer, between a pair of said carcass plies which are separated from each other only by at least one of said breakers over the entire area of said breakers; upon shaping said tire body into a tire having crown and sidewall regions, said acute angle of said cords of each of said carcass plies being greater in the sidewall region than in the crown region of the tire.

18. As an intermediate article of manufacture, a tire body in accordance with claim 17, wherein:
each of said carcass plies has cords oriented in a respective direction;
said carcass plies being positioned with their cord directions at acute angles to the longitudinal center line of said tread layer;

each of said breakers has cords oriented in a respective direction;
said breakers being positioned with their cord directions opposed to each other and at acute angles relative to the longitudinal center line of said tread layer.

19. As an intermediate article of manufacture, a tire body in accordance with claim 18, wherein:
said angles of said carcass plies are larger than said angles of said breakers by a maximum differential of approximately fifteen degrees.

20. As an intermediate article of manufacture, a tire body in accordance with claim 18, wherein:
said angles of said carcass plies are larger than said angles of said breakers by a maximum differential of approximately eight degrees.

21. As an intermediate article of manufacture, a tire body in accordance with claim 18, wherein:
said angles of said carcass plies are larger than said angles of said breakers by a minimum differential of approximately three degrees.

22. As an intermediate article of manufacture, a tire body in accordance with claim 17, wherein:
each of said carcass plies has cords oriented in a respective direction at an acute angle relative to the longitudinal center line of said tread layer;
each of said breakers has cords oriented in a respective direction at an acute angle relative to the longitudinal center line of said tread layer;
and the cord directions of said adjacent carcass plies slant oppositely to each other relative to said longitudinal center line of said tread layer and the cord directions of each pair of breakers slant oppositely to each other relative to said longitudinal center line of said tread layer.

23. As an intermediate article of manufacture, a tire body in accordance with claim 22, wherein:
said cords of each breaker slant in the same general direction as said cords of each carcass ply adjacent thereto relative to said longitudinal center line of said tread layer.

24. A bias belted pneumatic tire comprising a carcass including a pair of beads, a pair of carcass plies of tire cord fabric extending circumferentially of the tire and between the beads, and with additional plies disposed between the pair of carcass plies consisting of a pair only of superposed belt plies of tire cord fabric with each belt ply being in intimate contact with the belt ply and carcass ply next adjacent thereto.

* * * * *

PO-1050
(5/69)

UNITED STATES PATENT OFFICE
CERTIFICATE OF CORRECTION

Patent No. 3,780,782     Dated December 25, 1973

Inventor(s) George L. Jennings and Parks M. Nichols

It is certified that error appears in the above-identified patent and that said Letters Patent are hereby corrected as shown below:

Column 4, line 26, for "beakers" read --breakers--.
Column 9, line 28, for "of" read --than--.
Cancel claim 12.
Cancel claim 23.

On the cover sheet, after the Abstract, "24 Claims" should read -- 22 Claims --.

Signed and sealed this 1st day of October 1974.

(SEAL)
Attest:

McCOY M. GIBSON JR.
Attesting Officer

C. MRSHALL DANN
Commissioner of Patents